United States Patent
Saha

(10) Patent No.: US 11,809,845 B2
(45) Date of Patent: Nov. 7, 2023

(54) AUTOMATED VALIDATION SCRIPT GENERATION AND EXECUTION ENGINE

(71) Applicant: Allstate Solutions Private Limited, Bangalore (IN)

(72) Inventor: Amit Kumar Saha, Bangalore (IN)

(73) Assignee: Allstate Solutions Private Limited, Bangalore (IN)

( * ) Notice: Subject to any disclaimer, the term of this patent is extended or adjusted under 35 U.S.C. 154(b) by 0 days.

(21) Appl. No.: 17/516,856

(22) Filed: Nov. 2, 2021

(65) Prior Publication Data

US 2022/0137937 A1 May 5, 2022

Related U.S. Application Data

(60) Provisional application No. 63/109,105, filed on Nov. 3, 2020.

(51) Int. Cl.
*G06F 8/36* (2018.01)

(52) U.S. Cl.
CPC ........................ *G06F 8/36* (2013.01)

(58) Field of Classification Search
CPC .......................................................... G06F 8/36
USPC ................................ 717/108–124; 706/12–45
See application file for complete search history.

(56) References Cited

U.S. PATENT DOCUMENTS

| | | | | |
|---|---|---|---|---|
| 5,321,837 A * | 6/1994 | Daniel | ................ | G06F 11/3466 |
| | | | | 714/E11.2 |
| 6,002,869 A * | 12/1999 | Hinckley | ............ | G06F 11/3684 |
| | | | | 717/124 |
| 6,542,841 B1 * | 4/2003 | Snyder | ............... | H04B 10/0795 |
| | | | | 702/108 |
| 7,469,287 B1 * | 12/2008 | Castillo | ............... | H04L 41/0663 |
| | | | | 709/224 |
| 8,938,383 B2 * | 1/2015 | Ding | ................... | G06F 11/3684 |
| | | | | 382/229 |
| 10,977,166 B1 * | 4/2021 | Jaganmohan | ............ | G06N 5/02 |
| 10,990,940 B1 * | 4/2021 | Asthana | .................. | H04L 67/02 |
| 11,068,387 B1 * | 7/2021 | Bakshi | ............... | G06F 11/3692 |
| 11,074,107 B1 * | 7/2021 | Nandakumar | ............ | G06F 8/10 |
| 11,106,569 B1 * | 8/2021 | Chapagain | .......... | G06F 11/3688 |

(Continued)

OTHER PUBLICATIONS

Hargassner et al, "A Script-Based Testbed for Mobile Software Frameworks", IEEE, pp. 448-457 (Year: 2008).*

(Continued)

*Primary Examiner* — Anil Khatri
(74) *Attorney, Agent, or Firm* — Dinsmore & Shohl LLP

(57) ABSTRACT

Methods and systems for automatically generating validation scripts for software applications are disclosed. A computing device may receive a first application. The computing device may compare the first application to a plurality of stored applications. The computing device may determine a second application among the plurality of stored applications based on the comparing. The computing device may determine a first validation script associated with the second application. The computing device may automatically generate a second validation script for the first application based on the first validation script and a result of a comparison of the first application and the second application. The computing device may validate the first application using the second validation script.

17 Claims, 6 Drawing Sheets

(56) References Cited

U.S. PATENT DOCUMENTS

| | | | | |
|---|---|---|---|---|
| 11,609,985 | B1* | 3/2023 | Shemesh | G06F 21/51 |
| 11,620,296 | B2* | 4/2023 | Sriharsha | G06F 16/24568 |
| | | | | 706/12 |
| 11,636,025 | B2* | 4/2023 | Neumann | G06F 11/3688 |
| | | | | 717/124 |
| 11,636,282 | B2* | 4/2023 | Trim | G06V 10/764 |
| | | | | 706/12 |
| 2021/0096978 | A1* | 4/2021 | Stump | G06F 11/3688 |
| 2021/0374040 | A1* | 12/2021 | Kumar | G06F 11/3688 |
| 2021/0392144 | A1* | 12/2021 | Vaidyanath | G06F 16/285 |
| 2022/0006760 | A1* | 1/2022 | Lopes de Moraes | |
| | | | | G06F 40/242 |

OTHER PUBLICATIONS

Beyer et al, "Jaql: A Scripting Language for Large Scale Semistructured Data Analysis", ACM, pp. 1272-1283 (Year: 2011).*
Kamtuo et al, "Machine Learning for SQL Injection Prevention on Server-Side Scripting", IEEE, pp. 1-6 (Year: 2016).*
Fang et al, "DeepXSS: Cross Site Scripting Detection Based on Deep Learning", ACM, pp. 47-51 (Year: 2018).*
Kaur et al, "Detecting Blind Cross-Site Scripting Attacks Using Machine Learning", ACM, pp. 22-25 (Year: 2018).*
Vishnu et al, "Prediction of Cross-Site Scripting Attack Using Machine Learning Algorithms", ACM, pp. 1-5 (Year: 2014).*

* cited by examiner

NAME 501

EMAIL ADDRESS 502

ACTIVITY REASON 503

APPLICATION(S) 504

ENVIRONMENT 505

VALIDATION SCRIPT(S) 506

Validation Dashboard
500

FIG. 5

AUTOMATED VALIDATION SCRIPT GENERATION AND EXECUTION ENGINE

CROSS-REFERENCE TO RELATED APPLICATIONS

This application claims the benefit of U.S. Provisional application Ser. No. 63/109,105, filed Nov. 3, 2020 and entitled "AUTOMATED VALIDATION SCRIPT GENERATION AND EXECUTION ENGINE", the entirety thereof being hereby incorporated by reference herein.

FIELD

Aspects described herein generally relate to a platform that automates the generation of validation scripts based on machine learning and artificial intelligence. More specifically, one or more aspects described herein provide for generating validation scripts using the automated platform and validating one or more applications using the validation scripts.

BACKGROUND

Large-scale validation of interconnected applications may be time-consuming and inefficient. Different teams within an organization may be responsible for different interconnected applications that must all execute within a singular system. Validation of these different interconnected applications may require hundreds of hours and employees. In view of these challenges to application validation, an automated validation scripts development system may represent an improvement over conventional systems and components thereof. The description provided in the background section should not be assumed to be prior art merely because it is mentioned in or associated with the background section. The background section may include information that describes one or more aspects of the technology forming the subject of this disclosure.

SUMMARY

The following presents a simplified summary of various aspects described herein.This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards automatically generating validation scripts for software applications and automatically validating those software applications using the validation scripts.

A computing device may receive a first application. The computing device may compare the first application to a plurality of stored applications. The computing device may determine a second application based on the comparing. The computing device may determine a first validation script associated with the second application. The computing device may automatically generate a second validation script for the first application based on the first validation script and a result of a comparison of the first application and the second application. The computing device may validate the first application using the second validation script. The computing device may also use real-time validation events to validate the first application. The computing device may output validation data to a graphical user interface. These and additional aspects will be appreciated with the benefit of the disclosuresdiscussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 5 depicts a graphical user interface including a validation dashboard that maybe presented on a display device in accordance with one or more aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction, aspects described herein are directed towards automatically generating validation scripts using an automated validation scripts development and execution engine and validating one or more applications using the validation scripts.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof The use of the terms "connected," "coupled," and similar terms, is meant to include both direct and indirect connecting, coupling, and the like.

Figure 1:
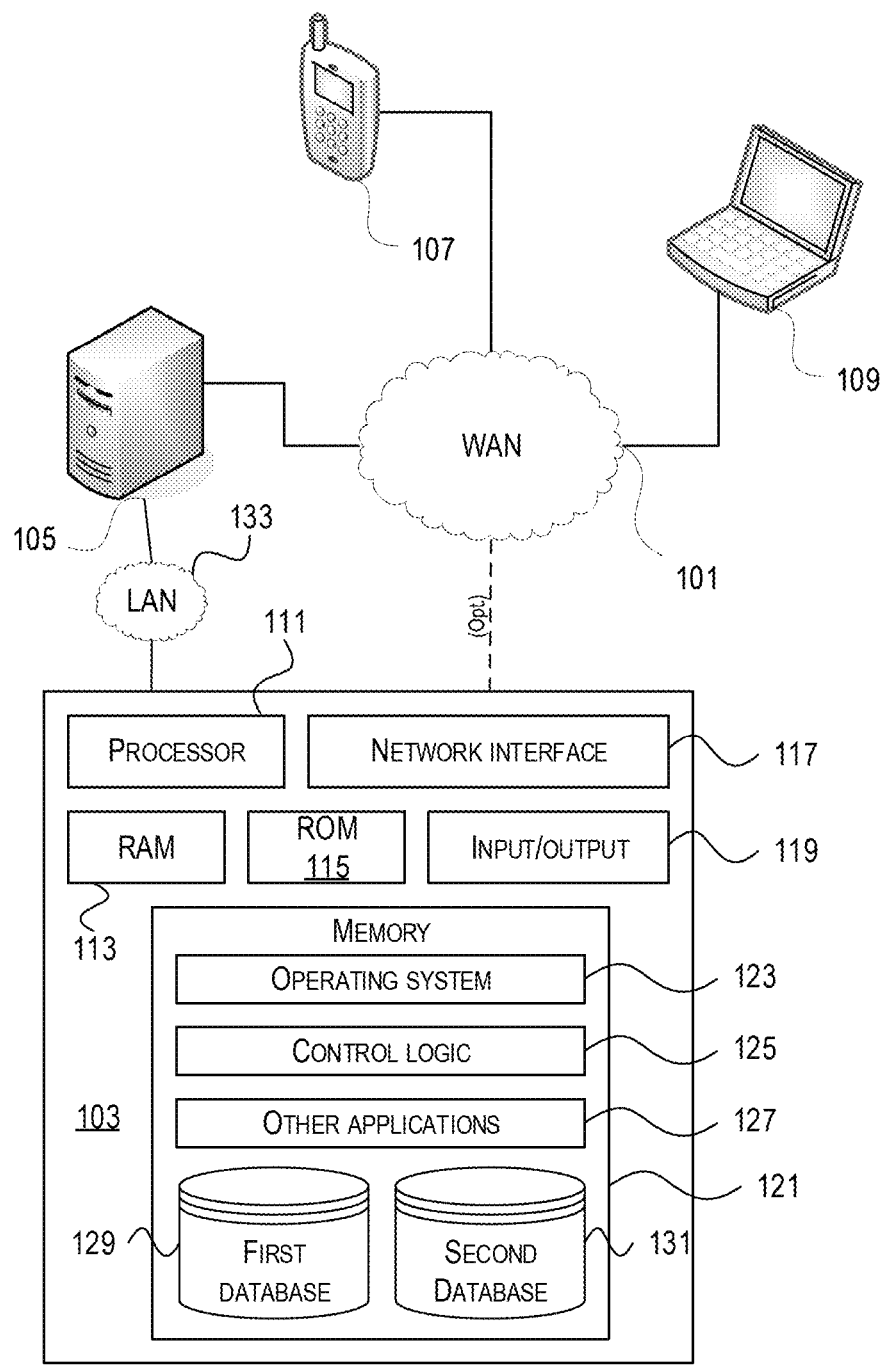
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 (which may additionally and/or alternatively be referred to as computing devices) may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server103 may be connected to web server 105 through which users interact with and obtain data asrequested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used forother purposes. For example, from client device 107 a user may access web server 105 usingan Internet browser, as is known in the art, or by executing a software application that communicates with web server 105 and/or data server 103 over a computer network (such asthe Internet).

Servers and applications may be combined on the same physical machines, and retain separate virtual or logical addresses, or may reside on separate physical machines. FIG. 1 illustrates just one example of a network architecture that may be used, and those of skill inthe art will appreciate that the specific network architecture and data processing devices usedmay vary as further described herein. For example, services provided by web server 105 and data server 103 may be combined on asingle server.

Each component 103, 105, 107, 109 may be any type of computer, server, or data processing device configured to perform the functions described herein. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, and/or physical databases, depending on system design. Devices 105, 107, and 109 may have similar or different architecture as described with respect to device 103. Those of skill in the art will appreciate that the functionality of data processing device 103 (ordevice 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
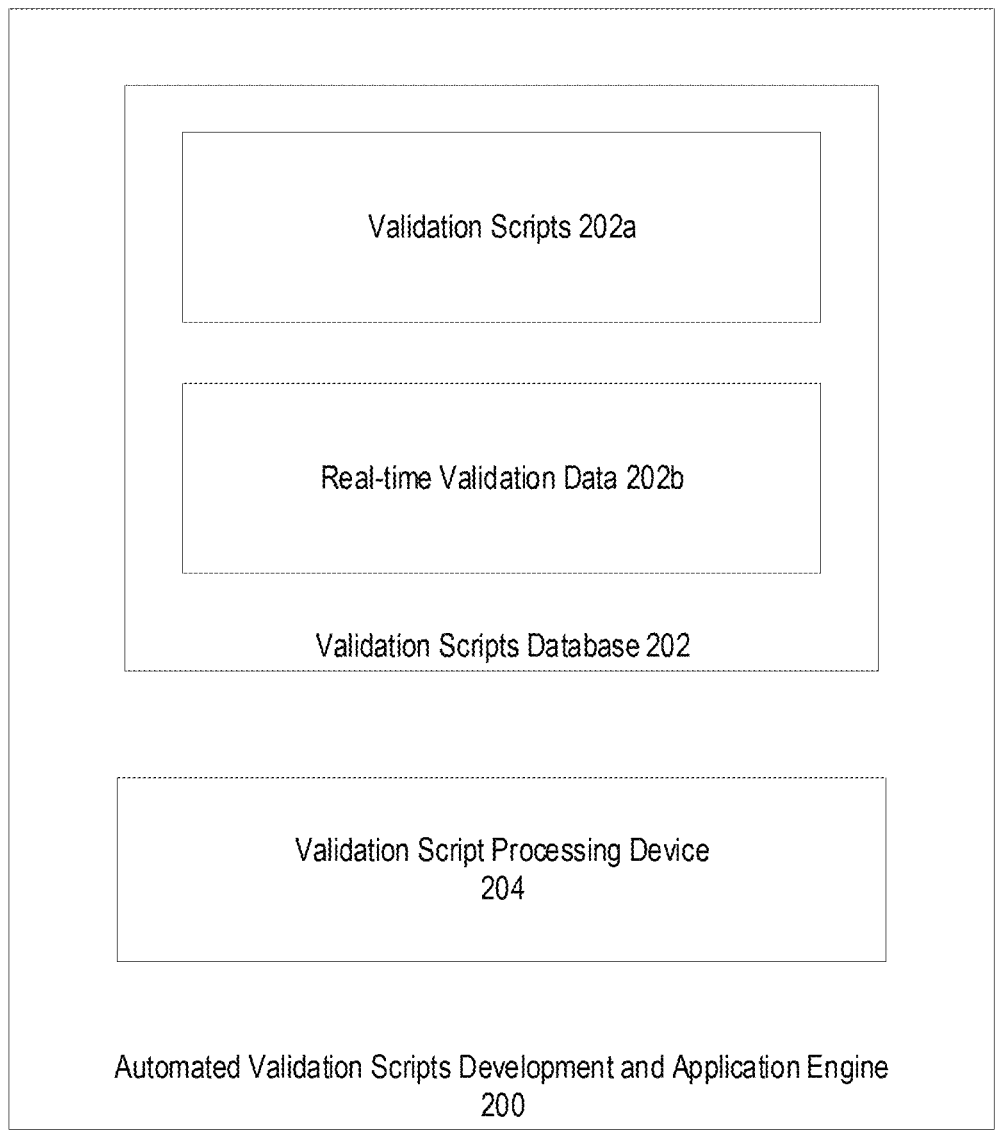
FIG. 2 depicts an automated validation scripts development and execution engine according to one or more aspects described herein.

FIG. 2 depicts a schematic representation of an automated validation scripts development and execution system 200, including validation scripts database 202 and validation script processing device 204 together embodying a validation scripts generation and execution engine. The validation scripts database 202 may store any data to be used by the automated validation scripts development and execution system 200 (including any of its components). For example, validation scripts database 202 may store one or more validation scripts 202a. Validation scripts 202a may be used to test software applications before and/or after the software applications are deployed within a system or server. Validation scripts 202a may be generated by the automated validation scripts development and execution system 200. Additionally, or alternatively, validation scripts 202a may be developed external to the automated validation scripts development and executionsystem 200 and then stored within the validation scripts database 202 for use by the automated validation scripts development and execution system 200. The applications associated witheach of the validation scripts stored in the validation scripts database 202 may also be storedby the validation scripts database 202. Validation scripts database 202 may also store real-time validation data 202b. The real-time validation data 202b may be any validation data collectedby automated validation scripts development and execution system 200 during development of a validation script. For example, the automated validation scripts development and execution system 200 may monitor and store, in real-time or near real-time, different validation events during the development of a validation script. For example, the automated validation scriptsdevelopment and execution system 200 may capture validation clicks, keystrokes, navigations, URLs, and the like. These validation events may then be stored in the validation scripts database 202 foruse by automated validation scripts development and execution system 200. In addition, the validation scripts database 202 may associate each of the validation events (and/or a subset of the validation events) with a particular validation script (and its associated application) stored in the validation scripts database 202.

The validation scripts processing device 204 may be used to automatically generate validation scripts and/or to automatically run validation scripts to validate various software applications before or after those software applications are deployed on a central system. The automatic generation of validation scripts by the validation scripts processing device 204 is discussed below with reference to FIG. 3. The automatic application of validation scripts by validation scripts processing device 204 is discussed below with reference to FIG. 4. According to alternative embodiments, the automated validation scripts development and execution system 200 may be triggered by a user to generate validation scripts and/or run validation scripts to validate software applications on demand or in response to at least one user-specified triggering event.

Figure 3:
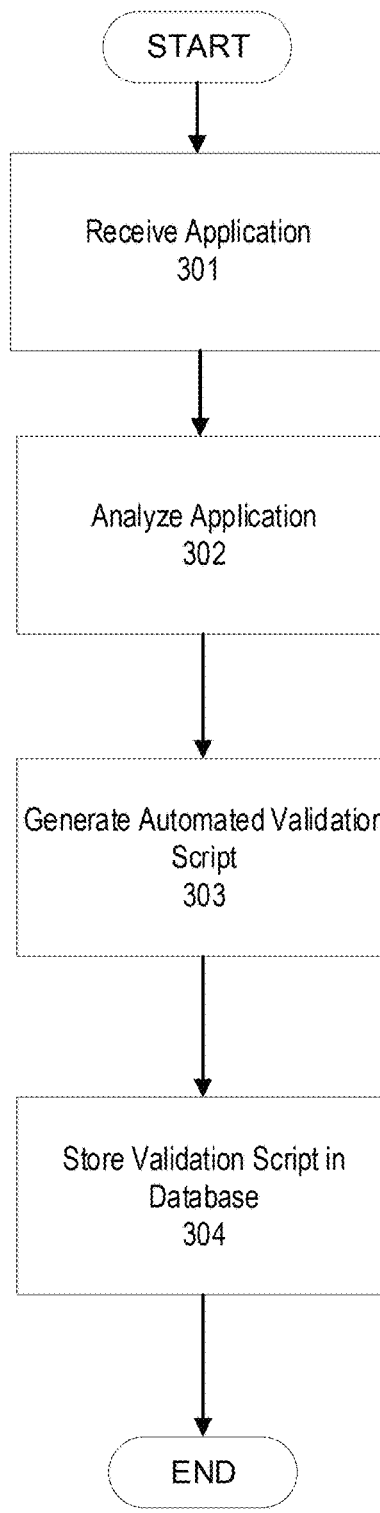
FIG. 3 depicts an illustrative flow chart with steps which may be performed to automatically generate validation scripts in accordance with one or more aspects described herein.

FIG. 3 is a flow chart depicting examples of steps that may be performed by a computing device to automatically generate a validation script. The computing device may be any one of the validation scripts processing device 204, network nodes 103, 105, 107, and 109 and/or may comprise one or more processors and memory storing instructions that, when executed by the one or more processors, cause performance of all or some of the steps depicted in FIG. 3. The steps depicted in FIG. 3 are illustrative and may be rearranged or omitted as desired.

In step 301, the computing device may receive an application to be validated. In one example, the computing device may receive the application based on a user entry made via a user interface presented by the computing device. In another example, the application may automatically be selected by the computing device. In addition to the application itself, the computing device may also receive additional validation-type data, such as specific features of the application to be validated, the types of validation to be performed, application dependencies (inputs, outputs, functions, subroutines, etc.) for consideration during validation, and the like. In further illustrative embodiments, these features of an application subject to validation may be automatically detected by the computing device upon receipt of the application for validation.

In step 302, the computing device may analyze the application to be validated. Analyzing the application may include analyzing the contents of the application, the inputs to the application, the outputs of the application, and the like. In one example, analyzing the application may include comparing the application to those stored in the validation scripts database 202. As noted above with reference to FIG. 2, the validation scripts database 202 may store validation scripts and the applications associated with those validation scripts. By comparing the application received at step 301 with those stored in the validation scripts database 202, the computing device may identify other applications that are similar to the received application. The computing device may then retrieve the validation scripts associated with those similar applications. Additionally, or alternatively, the computing device may retrieve the real-time validation events that are associated with the retrieved validation scripts.

In step 303, the computing device may automatically generate the validation scriptfor the application. Generation of the validation script may be performed using one or more artificial intelligence and/or machine learning algorithms (for example, linear regression, logistic regression, regression trees, and the like). These algorithms may be used to analyze the validation scripts associated with applications similar to the received application and/or the validation events associated with those validation scripts. For example, the computing device may use the validation scripts (and the corresponding real-time validation events) associated with similar applications to automatically generate the validation script for the received application. These validation scripts may serve as the template for the validation script for the received application. The computing device may then modify the template based on the similarities and/or differences between the received application and the applications stored in the validation scripts database 202 (e.g., based on the machine learning algorithms). In certain examples, over time, the validation script for any particular application may be updated, outdated, and/or modified as training data (e.g., additional similar applications and the corresponding validation events) is accumulated or removed. The addition or removal of such training data may allow for artificial intelligence and/or machine learning algorithms to generate validation scripts and/or validation script templates that are more efficient, more accurate, faster, and/or more reliable/reproducible.

In step 304, the computing device may store the validation script in the validation scripts database 202. The validation script may then be accessed to validate software applications (discussed below with reference to FIG. 4) or as a basis for the generation of validation scripts for other applications to be validated (as discussed with reference to FIG. 3). Accordingly, with each addition of a validation script to the validation scripts database 202, the automated validation scripts development and execution system 200 becomes better able to generate validation scripts that are more efficient, more accurate, faster, and/or more reliable/reproducible than conventional methods of validating software applications. Therefore, the automated validation scripts development and execution system 200 represents a technical improvement to computing validation functions and computing resources.

Figure 4:
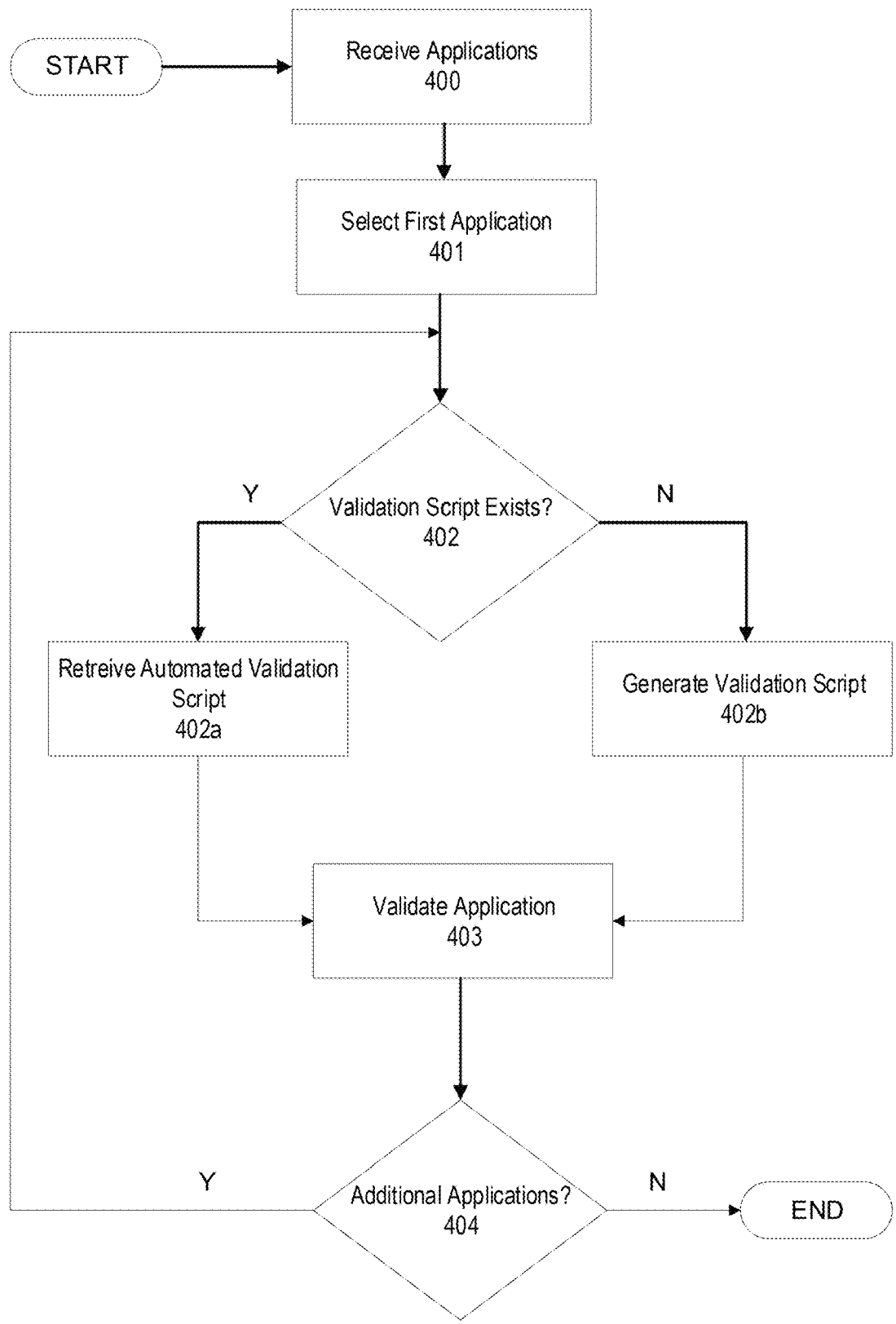
FIG. 4 depicts an illustrative flow chart with steps which may be performed to automatically validate one or more applications using one or more validation scripts in accordance with one or more aspects described herein.

FIG. 4 is a flow chart depicting examples of steps which may be performed by a computing device to automatically validate one or more applications using one or more validation scripts. The computing device may be any one of the validation scripts processing device 204, network nodes 103, 105, 107, and 109 and/or may comprise one or more processors and memory storing instructions that, when executed by the one or more processors, cause performance of all or some of the steps depicted in FIG. 4. The steps depicted in FIG. 4 are illustrative, and may be rearranged or omitted as desired.

In step 400, the computing device may receive one or more applications to be validated. In one example, the computing device may receive the applications from a graphical interface presented by the computing device (or a different computing device), as discussed below in reference to FIG. 5. In another example, the computing device may automatically select the one or more applications based on a determination that the one or more applications are not associated with any validation scripts.

In step 401, the computing device may select a first application of the one or more applications received in step 401. In one example, the order in which the applications are to be validated may be configured by the user using the graphical interface shown in FIG. 5. In other examples, the order may automatically be determined by the computing device based on an analysis of the applications. For example, if the computing device receives two applications in step 400, and determines that the output of one of those applications is used as an input in the other application, the validation of the one application may be done before the validation of the other application.

In step 402, the computing device may determine if the first application is already associated with a validation script. In one example, the computing device may make such a determination based on one or more inputs received the graphical interface shown in FIG. 5. For example, when providing the application to be validated, the user may also provide the particular validation script to be used to perform the validation. This validation script may be stored in validation scripts database 202. In another example, the computing device may make such a determination based on the contents of the application. For example, the contents of the application may reference a particular validation script (stored in the validation scripts database 202) to be used to validate the application. If the computing device determines that a validation script exists for the first application, then the computing device may, at step 402a, retrieve the validation script from the validation scripts database 202. If the computing device determines that there is no existing validation script for the first application, the computing device may, at step 402b, automatically generate a validation script for the first application using the flow shown in FIG. 3.

In step 403, the computing device may validate the application using the validation script. The validation script may verify that the application is producing the correct output data, and that all links within the application to other applications and/or components are functioning correctly. If errors are detected during execution of the validation script, the computing device may capture error data, including information identifying which portions of the application are associated with the error and screen captures of the error messages, if any. The error data may be saved by the computing device and may further be sent to one or more users.

In step 404, the computing device may determine if additional applications need tobe validated. If it is determined that there are additional applications, the computing device may select the next application to be validated, and processing may return to step 402. Ifthereare no additional applications, the validation is complete and processing may end.

FIG. 5 illustrates a user interface that may be presented to a user on a display device in accordance with one or more aspects described herein. The user interface may be a validation dashboard 500 that allows the user to configure the automated validation scripts development and execution system 200 to validate one or more applications. The validation dashboard may include a number of fields to be utilized by the user during the configuration of the validation. In field 501, the user may provide the user's name. In field 502, the user may provide the user's email address. The automated validation scripts development and execution system 200 may use the email address to provide the user with updates on the validation (for example, if an application was successfully validated without any errors, a message indicating the successful validation may be sent to this email address) and/or error data resulting from the validation. In field 503, the user may provide validation information to be used by the automated validation scripts development and execution system 200 in the generation of a validation script (for example, if there are particular portions of the application to be validated). In field 504, the user may provide the location(s) of each application to be validated, as well as the specific order in which the applications are to be validated, if any. In field 505, the user may provide the specific environment in which the application is to be validated. In one example, the user may specify that the validation of the application is to be performed in a stand-alone, self-contained environment. In another example, the user may specify that the validation of the application is to be performed within a simulation of the system in which the application will eventually be deployed. In field 506, the user may provide the locations of the validation scripts to be used for the validation (if any). This enables the system to perform the validation of the applications in a user-specified validation environment.

Figure 6:
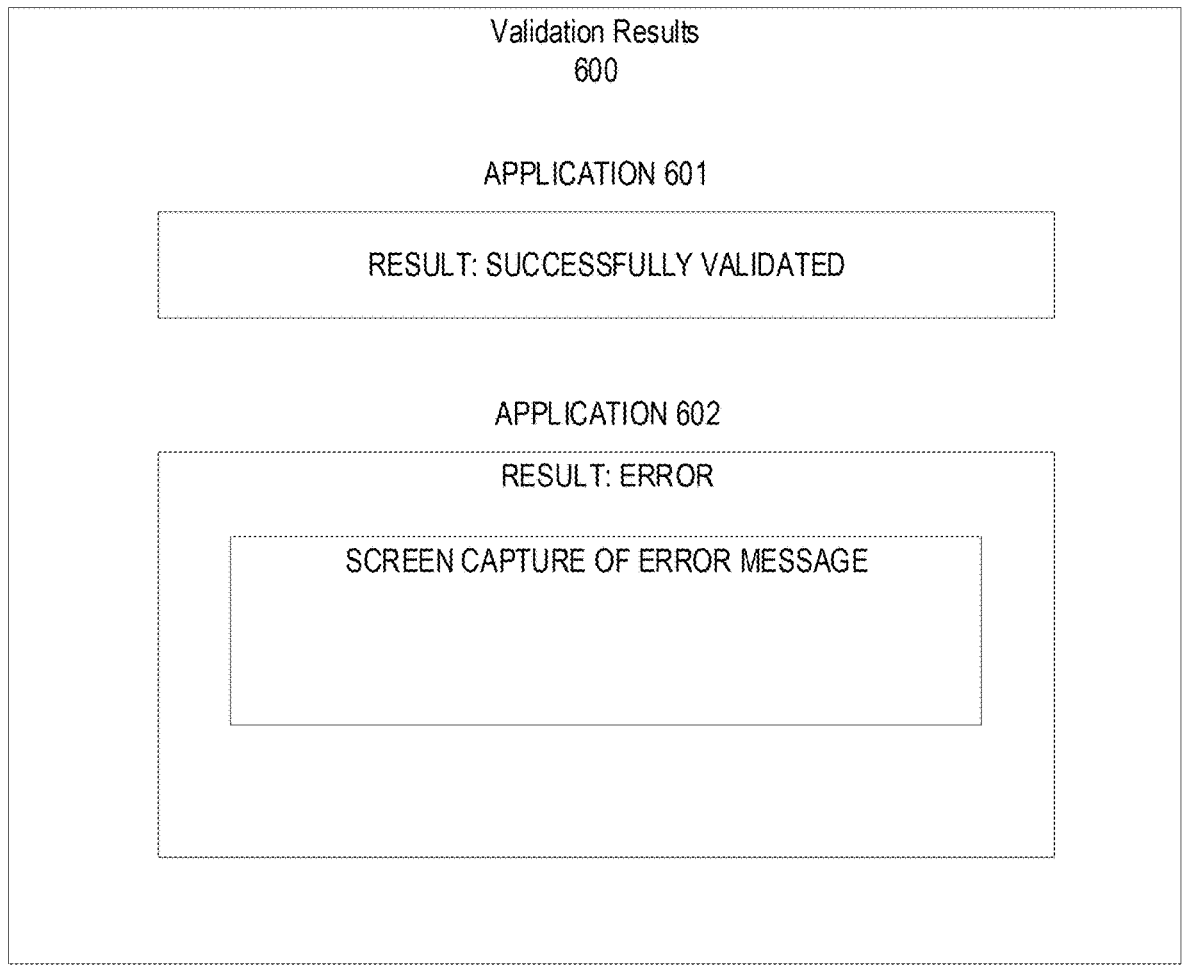
FIG. 6 depicts a graphical user interface including validation results that may be presented on a display device in accordance with one or more aspects described herein.

FIG. 6 illustrates validation and error data that may be sent to the user within an email or displayed within a graphical interface in accordance with one or more aspects described herein. The validation results 600 may include separate validation results for eachapplication that was validated. While only two application validation results are shown, it is to be understood the fewer results or more results could be included within the validation results 600. The results for the application 601 indicate that the validation was successfully completed. The results for application 602 indicate that the validation resulted in an error. The screen capture of the error message is provided within the results.

Although the subject matter has been described in language specific to structural features and/or methodological acts, it is to be understood that the subject matter defined in the appended claims is not necessarily limited to the specific features or acts described above. Rather, the specific features and acts described above are described as illustrative implementations of the following claims.

What is claimed is:

1. A method comprising:
receiving, by a computing device, a first application;
comparing, by the computing device, the first application to a plurality of stored applications using a machine learning algorithm to analyze validation scripts associated with the plurality of stored applications similar to the first application, wherein the validation scripts are generated by an automated validation scripts development and execution system and stored in a validation scripts database;
determining, by the computing device and based on the comparing, a second application among the plurality of stored applications;
determining, by the computing device, a first validation script associated with the second application;
retrieving, by the computing device, at least one validation event associated with the first validation script;
automatically generating, by the computing device, a second validation script for the first application, wherein the second validation script is generated based on the first validation script, the at least one validation event associated with the first validation script, and a result of a comparison of the first application and the second application; and
validating, by the computing device and using the second validation script, the first application.

2. The method of claim 1, wherein the validation further uses at least one validation event associated with the second validation script.

3. The method of claim 1, further comprising:
outputting at least one error message associated with the validating.

4. The method of claim 1, wherein the validating is performed within a user-specified validation environment.

5. The method of claim 1, wherein the automatically generating the second validation script for the first application comprises using a machine learning algorithm.

6. The method of claim 1, further comprising:
receiving, by the computing device, validation-type data associated with the first application, wherein the computing device determines the second application based on the validation-type data.

7. The method of claim 1, wherein the computing device generates the second validation script by modifying the first validation script.

8. The method of claim 1, wherein the computing device generates the second validation script based on a reference in the first application.

9. A system comprising:
a processor configured to execute computer-executable instructions; and
a memory storing the computer-executable instructions that, when executed by the processor, cause the system to:
receive a first application;
compare the first application to a plurality of stored applications using a machine learning algorithm to analyze validation scripts associated with the plurality of stored applications similar to the first application, wherein the validation scripts are generated by an automated validation scripts development and execution system and stored in a validation scripts database;
determine a second application among the plurality of stored applications based on the comparing;
determine a first validation script associated with the second application;
retrieve at least one validation event associated with the first validation script;
automatically generate a second validation script for the first application, wherein the second validation script is generated based on the first validation script, the at least one validation event associated with the first validation script, and a result of a comparison of the first application and the second application; and
validate the first application using the second validation script.

10. The system of claim 9, wherein the validation further uses at least one validation event associated with the second validation script.

11. The system of claim 9, wherein the computer-executable instructions, when executed by the processor, cause the system to output at least one error message associated with the validating.

12. The system of claim 9, wherein the validating is performed within a user-specified validation environment.

13. The system of claim 9, wherein the computer-executable instructions, when executed by the processor, cause the system to automatically generate the second validation script for the first application by using a machine learning algorithm.

14. The system of claim 9, wherein the computer-executable instructions, when executed by the processor, cause the system to output a result of the validating.

15. The system of claim 9, wherein the computer-executable instructions, when executed by the processor, cause the system to receive a validation-type data associated with the first application, and to determine the second application based on the validation-type data.

16. The system of claim 9, wherein the computer-executable instructions, when executed by the processor, cause the system to generate the second validation script by modifying the first validation script.

17. The system of claim 9, wherein the computer-executable instructions, when executed by the processor, cause the system to generate the second validation script based on a reference in the first application.

* * * * *